United States Patent [19]

Saito et al.

[11] Patent Number: 4,960,375
[45] Date of Patent: Oct. 2, 1990

[54] DIE FOR PROFILE EXTRUSION

[75] Inventors: Yoshio Saito; Shigeo Yoshino, both of Chiba, Japan

[73] Assignee: Kinugawa Rubber Industrial Co., Ltd., Chiba, Japan

[21] Appl. No.: 327,524

[22] Filed: Mar. 23, 1989

[30] Foreign Application Priority Data

Mar. 24, 1988 [JP] Japan .................................. 63-70488

[51] Int. Cl.⁵ ............................................ B29C 47/12
[52] U.S. Cl. ................... 425/131.1; 264/167; 264/171; 264/177.1; 264/177.16; 425/190; 425/461; 425/463; 425/465
[58] Field of Search ............ 264/177.1, 177.13, 177.14, 264/177.16, 167, 171; 425/461, 463, 465, 466, 131.1, 190

[56] References Cited

U.S. PATENT DOCUMENTS

| | | | |
|---|---|---|---|
| 3,819,451 | 6/1974 | Nalle | 264/177.14 |
| 4,187,068 | 2/1980 | Vassar | 425/466 |
| 4,419,315 | 12/1983 | Kessler | 264/177.1 |
| 4,455,133 | 6/1984 | Jakob et al. | 264/177.1 |
| 4,522,678 | 6/1985 | Zieke | 425/466 |
| 4,584,150 | 4/1986 | Ballocca | 264/167 |
| 4,765,936 | 8/1988 | Ballocca | 264/177.1 |

FOREIGN PATENT DOCUMENTS

| | | | |
|---|---|---|---|
| 59-171735 | 9/1984 | Japan . | |
| 62-121030 | 6/1987 | Japan | 264/176.1 |

Primary Examiner—Jay H. Woo
Assistant Examiner—James P. Mackey
Attorney, Agent, or Firm—Bachman & LaPointe

[57] ABSTRACT

A die for a profile extrusion for partly varying the profile of articles during a molding operation is provided. The die comprises a stationary die assembly and movable die assembly slidable on a surface thereof. Each die assembly includes an outlet port for defining a part of products. The stationary die further includes an opening functioning as a third outlet port. The third outlet port may vary its opening shape according to the sliding of the movable die on a surface of the stationary die during an extrusion molding operation with the result that the width of a connecting portion between the parts formed by the outlet port of the movable and the stationary die is varied. It will be noted that an article may be produced which has variably sized portions.

13 Claims, 4 Drawing Sheets

DIE FOR PROFILE EXTRUSION

BACKGROUND OF THE INVENTION

The present invention relates generally to a die for profile extrusion. More particularly, the invention relates to an improved die for profile extrusion which is applicable, although not exclusively, to the molding of a weatherstrip having a hollow shielding portion of which the height varies along the longitudinal direction thereof.

A typical extrusion molding produces an article having the same profile successively throughout the extrusion molding operation. For example, in the extrusion molding for a weatherstrip comprised of a welt and a semicylindrical, hollow shielding portion, the geometry of the extruded product, especially of the hollow shielding portion and portions thereof connected to the welt, is fixed. Tight shielding of a weatherstrip for opening corners of a vehicle or for uneven counter parts for example tends to require a weatherstrip including a shielding portion which has varying heights.

Recently, profile extrusion molding has been developed which is adapted for changing the location of an outlet port of a die during an extrusion molding operation to form a profile product having a different geometry thereof.

Japanese Pat. First Publication (tokkaisho) No. 59-171735 discloses an improved die assembly for profile extrusion which is available to form a weatherstrip. The die assembly comprises a stationary die and a movable die and is adapted for varying the connecting positions of a hollow shielding portion to a welt of the weatherstrip. The movable die includes a C-shaped outlet port for defining the hollow shielding portion, while the stationary die includes a straight shaped outlet port for defining the welt and a material feed path for the C-shaped outlet port of the movable die. The movable die further includes a material feed cavity for the C-shaped outlet port which communicates with the material feed path of the stationary die. With the structure of this die assembly, the movable die is slidable with respect to the stationary die to vary the connecting positions of the hollow shielding portion to the welt over the width of the latter. It will be thus noted that a weatherstrip may be obtained including a welt and a hollow shielding portion of which the connecting position to the welt is varied.

However, in a weatherstrip for a vehicle for example, a hollow shielding portion having a different height from a welt is necessary in order to obtain tight shielding applicable to long parts having a different height in the longitudinal direction.

SUMMARY OF THE INVENTION

Accordingly, it is an object of the present invention to provide an improved die for profile extrusion which is adapted for varying the geometry of articles effectively during an extruding operation.

According to one aspect of the present invention, there is provided a die for profile extrusion for forming articles which include first and second profile sections, which comprises a stationary die and a movable die, slidable with respect to the stationary die, comprising a first outlet port, provided in the stationary die, for restricting the flow of article material to define the first profile section of the article, a second outlet port, provided in the movable die, for restricting the flow of article material to define the second profile section, and an opening, provided in the stationary die, for functioning as a third outlet port according to [he movement of the movable die with respect to the stationary die, the third outlet port providing means for varying the geometry of the second profile section.

According to another aspect of the invention, there is provided a die for profile extrusion for forming articles which include a first profile section and a second profile section, which comprises a stationary die and a movable die slidable on a surface of the stationary die, comprising a first outlet port, provided in the stationary die, for restricting the flow of a material to define the first profile section of the article, a second outlet port, provided in the movable die, for restricting the flow of a material to define the second profile section, and a feed port provided in the stationary die and aligning with the second outlet port to supply the material for the second profile section thereto, the feed outlet port defining a third outlet port according to the sliding of the movable die on the surface of the stationary die in a predetermined direction to provide an additional profile section to the second profile section so as to vary the geometry of the second profile section.

According to a further aspect of the invention, there is provided a die for profile extrusion for forming a weatherstrip including a welt section and a shielding section, which comprises a stationary die and a movable die slidable on a surface of the stationary die, comprising a first feed path, provided in the stationary die, for feeding a material for the welt section of the weatherstrip, a first outlet port provided in the stationary die and communicating with the first feed path, the first outlet port restricting the flow of the material to define the welt section, a second feed path independent of said first feed path, passing through the stationary and the movable dies, for feeding a material for the shielding section, a second outlet port provided in the movable die and communicating with the second feed path, the second outlet port restricting the flow of the material to define the shielding section, a third feed path, provided in the stationary die, for feeding a material for the shielding section, and a third outlet port provided in the stationary die and for defining the connecting section of the shielding section to the welt section, the third outlet port communicating with said third feed path, the opening configuration varying according to the displacement of the movable die with respect to the stationary die to vary the size of the connecting section.

According to a still further aspect of the invention, there is provided a die for profile extrusion for forming articles which comprises a stationary die and a movable die slidable with respect to the stationary die, comprising a first outlet port, provided in the movable die, for restricting the flow of article material to define the article, and an opening, provided in the stationary die, communicating with the first outlet port to feed the article material thereto, the opening functioning as a second outlet port defined by the sliding of the movable die with respect to the stationary die, the movable die slidable in a direction perpendicular to the direction of the extrusion to vary the geometry of the article.

BRIEF DESCRIPTION OF THE DRAWINGS

The present invention will be understood from the detailed description given hereinbelow and from the accompanying drawings of the preferred embodiments which are given for explanation and understanding only and are not intended to imply limitations to the invention.

DESCRIPTION OF THE PREFERRED EMBODIMENTS

Figure 1:
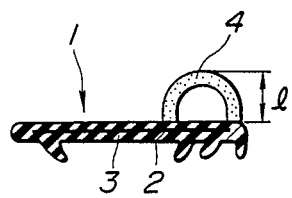
FIG. 1 is a cross sectional view which shows a weatherstrip formed by a die for profile extrusion according to the present invention.

Referring now to the drawings, particularly to FIG. 1, a weatherstrip 1 available to a vehicle for example which is molded by a die according to the present invention is shown. The weatherstrip 1 is generally formed with a welt 3 having a plurality of protrusions on a surface thereof and a shielding portion 4 of substantially C-shaped cross section which is integrally formed on the other surface thereof so as to provide a hollow portion. The welt 3 has a metal strip member 2 extending longitudinally in the middle portion thereof. The strip member 2 functions so as to maintain a given configuration into which the welt 3 is folded to allow reception of the edge of an opening flange of a vehicle window for example. The welt 3 may be made of a solid rubber and the shielding portion 4 may be made of a sponge rubber. They are formed together by so-called double extrusion well known in the art. The weatherstrip 1 is generally extruded with the flat welt 3 as shown. It will be noted that a shielding portion 4 of various height a can be extruded by a die, according to the present invention during one molding operation as described hereinbelow.

Figure 2:
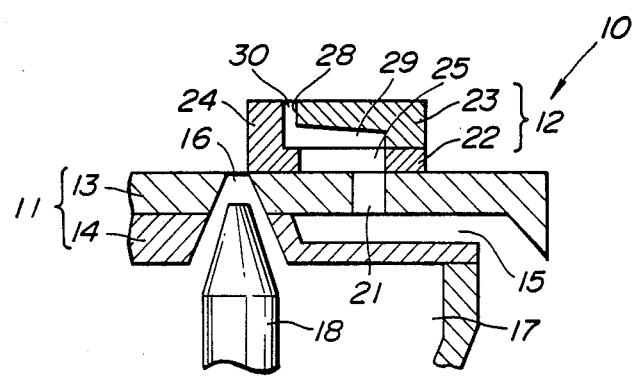
FIG. 2 is a cross sectional view of a die for profile extrusion according to the invention which is taken along the line 1—1 indicated in FIG. 3.
Figure 3:
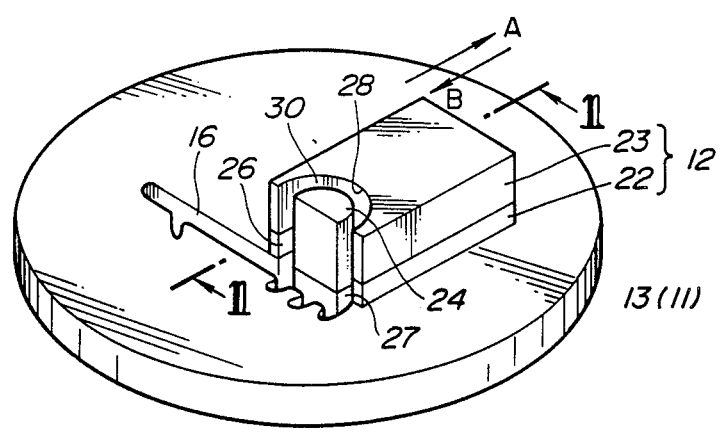
FIG. 3 is a perspective view which shows a die according to the invention.
Figure 4:
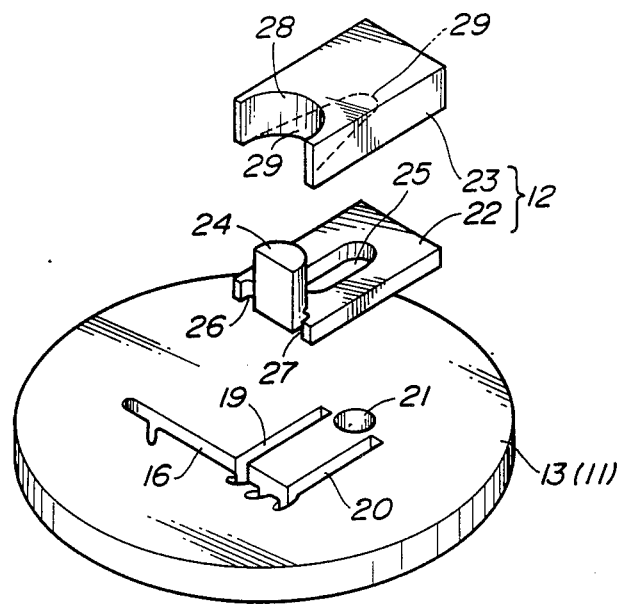
FIG. 4 is an exploded perspective view of a die shown in FIG. 3.
Figure 5:
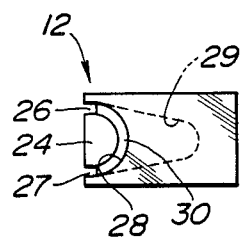
FIG. 5 is a plane view which shows a movable die assembly.
Figure 6:
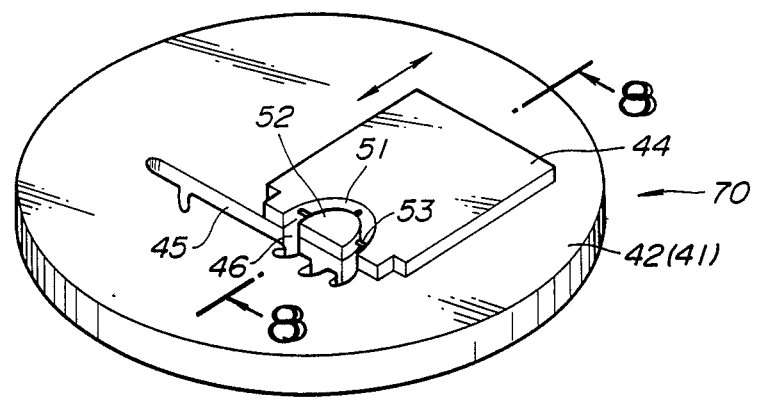
FIG. 6 is a perspective view which shows a die of a second embodiment according to the invention.
Figure 7:
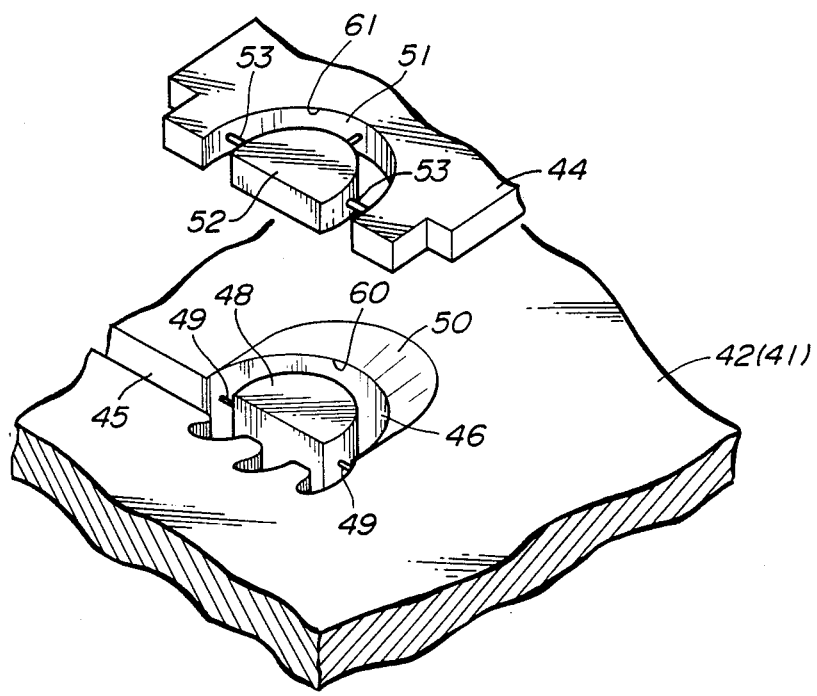
FIG. 7 is an exploded perspective view which shows material outlet ports of a stationary die assembly and a movable die assembly of a die of a second embodiment.

Referring to FIGS. 2 to 4, there is illustrated a die 10 for profile extrusion according to the invention. The die 10 comprises generally a stationary die assembly 11 and a movable die assembly 12 which is disposed on a surface of the stationary die assembly. The die assembly 11 is secured to an extruder (not shown). The die assembly 12 is adapted for being slidable on a surface of the stationary die assembly in a predetermined direction.

The die assembly 11, as can be seen in the drawings, comprises a disc-type first stationary die 13 and a second stationary die 14 connected to a extruder (not shown). Formed in the second stationary die is a recessed portion. The recessed portion defines a material feed path 15, to the back surface of the first stationary die 13, for supplying the sponge rubber material to the movable die assembly 12. In addition, the dies 13 and 14 have elongated and tapered openings. These openings define an outlet port 16, as the dies 13 and 14 are assembled, into which a nozzle 18 for supplying a material of the metal strip member 2 is partly inserted and which communicates with a material feed cavity 17 for the solid rubber material. The material feed cavity is provided in the extruder. The outlet port 16 has an opening shape for defining a cross sectional shape of the welt 3 and a plurality of grooves for defining protrusions formed on a surface of the welt in a side thereof.

Two parallel feed ports 19 and 20 are, as shown in FIG. 4, provided in the first stationary die 13 and extend perpendicular to the outlet port 16 and are connected therewith. Each of these outlet ports 19 and 20 communicates with the material feed path 15 for the sponge rubber material which is provided between the first and second stationary dies 13 and 14. Moreover, a through opening 21 is provided as a feed port in the first stationary die 13 which guides the sponge rubber material to flow from the material feed path 15 to the movable die assembly 12.

On the other hand, the movable die assembly 12 comprises a first movable die 22 and a second movable die 23 attached to the first die. This die assembly is in the form of a substantially rectangular block-shape having a size sufficient to cover the pair of feed ports 19 and 20. The first movable die 22 includes, as shown in FIG. 4, a half cylindrical portion 24 a pair of cut-out portions 26 and 27, and an elongated through opening 25 in the middle portion thereof which defines a portion of a feed cavity within the movable die assembly. The half cylindrical portion 24 extends vertically from the first movable die 22 so as to allow the material flow to define a hollow section in the shielding portion 4. The cut-out portions 26 and 27 are located on both sides of the cylindrical portion 24 so as to align with the feed ports 19 and 20 respectively to define the connecting portions of the shielding portion 4 to the welt 3.

The second movable die 23 includes a semicircular cut-out portion 28 formed in an end thereof and a recessed portion 29. The cut-out portion 28 cooperates with the half cylindrical portion 24 of the first movable die 22 to define a C-shaped outlet port 30. The outlet port 30 serves to form the arch of the shielding portion 4. The ceiling of the recessed portion 29, as shown in FIG. 4, angles upward to coincide with the cut-out portion 28. Tapered surfaces are provided so as to allow the material fed from the feed port 21 through the elongated opening 25 to the outlet port 30 to flow smoothly regardless of the location of the movable assembly with respect to the feed port 21.

As described above, the first die 22 is attached to the second die 23 to form the movable assembly 12. The attachment may be effected by screws or other connecting means.

In the profile extrusion operation, the solid rubber material fed from the material feed cavity 17 is extruded from the outlet port 16 of the stationary die assembly 11 with the metal strip member 2 from the nozzle 18 to form the welt 3 having a predetermined shape. At the same time, the sponge rubber material is fed from the material feed path 15 to the feed ports 19 and 20 and then extruded from the cut-out portions 26 and 27 to form the connecting portions of the shielding portion 4 to the welt 3. Moreover, the material fed from the material feed path 15 flows through feed part 21 partly to the feed cavity formed by the opening 25 and the recessed portion 29 to be extruded from the C-shaped outlet port 30, forming the major portion, or the arch section of the shielding portion 4. It will be appreciated that the materials extruded from the outlet ports 16 and 30 and cut-out portions 26 and 27 are bonded integrally to mold the weatherstrip 1 having a cross sectional shape as shown in FIG. 1.

During the continuous extruding operation, the displacement of the movable die assembly 12 on a surface of the stationary die assembly 11 in the direction indicated by an arrow "A" in FIG. 3 causes the blocked sections of the feed ports 19 and 20 to be exposed gradually. The sponge rubber material is further extruded from the exposed areas to provide additional width to the portion connecting the welt to the shielding portion 4. It will thus be noted that the connecting portions extend, increasing the overall height $\chi$ of the shielding portion 4. Alternatively, the displacement in the direction shown by an arrow "B" causes the exposed areas of the feed ports 19 and 20 to be closed, decreasing the height $\chi$. It will be therefore noted that a weatherstrip 1 with a shielding portion of various heights $\chi$ can be produced by the die 10 according to the invention.

The lateral displacement of the movable die assembly 12 with respect to the stationary die assembly 11 is carried out within the range which allows the communication between the recessed portion 29 and the feed port 21 of the first stationary die 13. Therefore, the shifting of the movable die assembly 12 in varies the projecting height $\chi$ of the shielding portion 4 by changing the distance between the outlet port 30 and the feed port 21. The provision of the opening 25 and the recessed portion 29 allows the stable flow of material through outlet port 30. It will be thus appreciated that a desired thickness of any section of the shielding portion and any configuration thereof may be obtained according to the location of the movable die assembly 12 with respect to the stationary die assembly 11.

Moreover, in the die 10 according to the invention, the provision of two material flows through the feed ports 19 and 20 and the outlet port 30 for the shielding portion 4 allows the projecting height $\chi$ to vary greatly.

Figure 8:
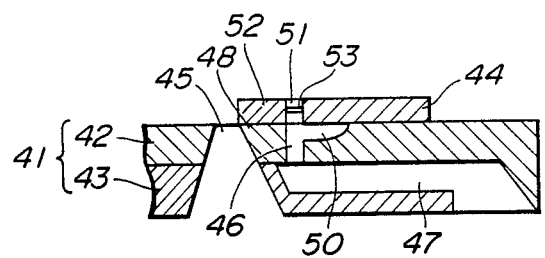
FIG. 8 is a cross sectional view taken along the line 8—8 indicated in FIG. 6.
Figure 9:
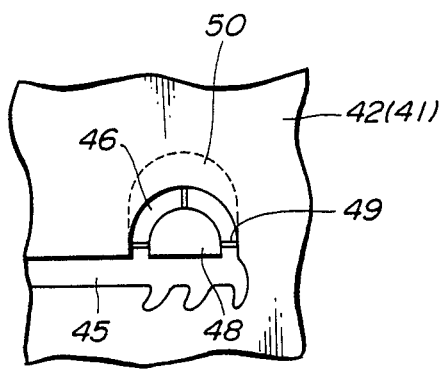
FIG. 9 is a plane view which shows an outlet port of a die of a second embodiment which defines a shielding portion of a weatherstrip.

Referring to FIGS. 6 to 9, a second embodiment of a die for profile extrusion according to the present invention is shown. A die 70 comprises generally a stationary die assembly 41 and a movable die 44. The stationary die assembly 41 comprises a first stationary die 42 and a second stationary die 43. The movable die 44 is adapted for sliding on a surface of the stationary die assembly 41 in the direction indicated by arrow shown in FIG. 6. An outlet port 45 for defining the welt 3 of the weatherstrip 1 is provided in the stationary die assembly 41. This outlet port, similarly to the above described embodiment, is connected to the material feed cavity 17 for the solid rubber material (see FIG. 2). The stationary die assembly 41 further includes a half cylindrical opening 60 in an end of the outlet port 45 in which a half cylindrical portion 48 is provided. The opening 60 communicates with a material feed path 47, as shown in FIG. 8, defined by a recessed portion provided in the second stationary die 43 and the back surface of the first stationary die 42. In the second embodiment, no second movable die for supporting to the half cylindrical portion 48 (which would correspond to the first movable die 22 as shown in FIG. 4) is provided. The half cylindrical portion 48 is therefore supported by three pins 49 so as to suspend it at a predetermined distance from the inner surface of the half cylindrical opening 60 to define a C-shaped outlet port 46. A crescent-shaped recessed portion 50 is formed in the surface of the first stationary die 42 so as to extend from the edge of the outlet port 46 to the traveling direction of the movable die 44. The final profile of the shielding portion 4 is dependent upon the position of the movable die 44. The outlet port 46 may thus take the form of a configuration which is approximately identical with that of the shielding portion 4.

The movable die 44 is in the form of a substantially rectangular fat shape and includes a semicircular cut-out portion 61 in its end section. Similarly to the stationary die assembly 41, a semicircular core portion 52 is suspended from the inner surface of the cut-out portion 61 by three pins 53 so as to be spaced therefrom to define a C-shaped outlet port 51. The shape of this outlet port is identical with that of the cross section of the shielding portion 4.

In the second embodiment, the sponge rubber material is fed from the material feed path 47 through the outlet port 46 and the recessed portion 50 of the first stationary die 42. The flow of the material is restricted by the outlet port 51 of the movable die 44 to form the hollow shielding portion 4 having a C-shaped cross section. During the extrusion molding operation, the slightly lateral displacement of the movable die 44 with respect to the stationary die assembly 41 in the outward direction of an arrow in FIG. 6 causes the portions connecting the shielding 4 to the welt 3 to vary its width, increasing the overall height of the shielding portion. The major portion of the shielding member 4 is formed by the outlet port 51 of the movable die 44.

In the extrusion molding according to the die 70 of the second embodiment, the pins 49 and 53 divides the flow of sponge rubber material through the outlet ports 46 and 51. The divided material can however be bonded integrally again on passing the pins to form the shielding portion 4 evenly.

Even when the movable die 44 moves during extruding operation and the outlet port 51 is shifted from the outlet port 46, the sponge rubber material is supplied through the recessed portion 50 communicating with the outlet port 46. It will be thus appreciated that the stable and fixed flow of the material from the outlet port 51 can be obtained regardless of the movement of the movable die 44

Accordingly, in the die for profile extrusion according to the present invention, the fixed flow direction of material from the C-shaped outlet port of the movable die is obtained regardless of the position thereof with respect to the stationary die assembly. This results in an evenly constituted thickness and cross sectional configuration of the shielding portion of the weatherstrip.

Moreover, the provision of a feed port, in the stationary die assembly, for defining a section of a shielding portion of a weatherstrip can define various heights thereof according to the shifting of the movable die with respect to the stationary die during the extrusion molding operation.

Although the invention has been shown and described with respect to a best mode embodiment thereof, it should be understood by those skilled in the art that foregoing and various other changes, omission, and additions in the form and detail thereof may be made therein without departing from the spirit and scope of the invention.

What is claimed is:

1. A die for profile extrusions for forming an article including first and second profile sections, which comprises a stationary die and a movable die, slidable with respect to the stationary die, comprising:

a first feed path for feeding article material for the first profile section of the article;

a first outlet port, provided in the stationary die, communicating with said first feed path, said first outlet port having a cross sectional profile corresponding to a cross sectional profile of the first profile section of the article so that the flow of the article material supplied from said first feed path is restricted to define the first profile section of the article;

a second feed path for feeding article material for the second profile section of the article;

a second outlet port, provided in the movable die, communicating with said second feed path, said second outlet port having a cross sectional profile corresponding to a cross sectional profile of the second profile section of the article so that the flow of the article material supplied from said second feed path is restricted to define the second profile section;

a third feed path independent of said second feed path for feeding article material; and an opening, provided in the stationary die, communicating with said third feed path, said opening defining a third outlet port according to the movement of the movable die with respect to the stationary die, said third outlet port having a cross sectional profile corresponding to a cross sectional profile of an additional profile section to the second profile section of the article so that the flow of the article material supplied from said third feed path is restricted to vary the geometry of the second profile section.

2. A die as set forth in claim 1, wherein the movable die slide on a surface of the stationary die to define an opening of said third outlet port dependent upon positional relationship between the movable die and the stationary die so as to vary the geometry of the second profile section.

3. A die as set forth in claim 1, further comprising a feed cavity formed in the movable die, said feed cavity communicating between said second feed path and said second outlet port so as to allow said material for the second profile section to be extruded from said second outlet port at a fixed rate regardless of the movement of the movable die with respect to the stationary die within a predetermined range which allows the communication between said feed cavity and said second feed path.

4. A die as set forth in claim 1, wherein the movable die comprises a first movable die and a second movable die, said second outlet port including a first opening provided in said first movable die and a second opening provided in said second movable die, said first opening communicating with said third feed path and defining a portion of the second profile section connecting to the first profile section, said second opening communicating with said second feed path and defining another portion of said second profile section.

5. A die as set forth in claim 3, wherein said feed cavity includes a portion defined by tapered side walls so as to guide smoothly said material for the second profile section to the second outlet port.

6. A die as set forth in claim 6, wherein said first movable die includes a semicylindrical member located within said second opening and having a cross sectional profile conforming to a hollow portion of a hollow semicylindrical shielding section of the article, said second opening being in the form of a semicircular shape to define the external form of said hollow semicylindrical shielding section.

7. A die as set forth in claim 6, wherein aid opening of the stationary die is provided with a pair of parallel elongated openings extending perpendicularly from said first outlet port, said first opening being provided with a pair of cut-out portions, aligned with each elongated opening, communicating with said elongated openings for defining the connecting portions of said hollow semicylindrical shielding section to the welt section.

8. A die as set forth in claim 7, wherein the width of said connecting portions vary according to the movement of the movable die with respect to the stationary die.

9. A die for forming articles by profile extrusion which include a first profile section and a second profile section, which comprises a stationary die and a movable die slidable on a surface of the stationary die comprising:

a first outlet port, provided in the stationary die, having a cross sectional profile corresponding to a cross sectional profile of the first profile section of the article so that article material is extruded to define the first profile section of the article;

a second outlet port, provided in the movable die, having a cross sectional profile corresponding to a cross sectional profile of the second profile section of the article so that the flow of article material is restricted to define the second profile section;

a feed port provided in the stationary die and aligning with said second outlet port to supply said material for the second profile section thereto; and a recessed portion formed, in the stationary die, adjacent to said second outlet port so as to communicate therewith, said recessed portion coinciding with said second outlet port according to the sliding of the movable die relative to the stationary die so as to allow the article material supplied from said feed port to flow to said second outlet port to vary the geometry of the second profile section.

10. A die as set forth in claim 9, wherein said article's second profile section has a hollow portion, said second outlet port including a core member formed therein having a cross sectional configuration corresponding to said hollow portion, said feed port including a core member formed therein having a cross sectional configuration corresponding to portions of the second profile section connecting to the first profile section in cooperation with said first outlet port when said second outlet port is shifted with regard to said first outlet port.

11. A die as set forth in claim 10, wherein said core member for said second outlet port is supported by a pin one end of which is inserted into the side wall of said core member and the other end of which is inserted into the inner wall of said second outlet port and, said core member for said feed port is also supported by a pin one end of which is inserted into the side wall of said core member and other of which is inserted into the inner wall of said feed port.

12. A die for forming an article including a first profile section, a second profile section, and a third profile section, said second profile section connecting between the first and the third profile sections, comprising:

a stationary die in which a first outlet port and a second outlet port are formed, said first outlet port having a cross sectional profile corresponding to that of the first profile section so that article material is extruded to define the first profile section, said second outlet port having a cross sectional profile corresponding to that of the second profile section so that article material is extruded to define the second profile section; and a movable die, slidable on a surface of said stationary die, in which a third outlet port is formed, said third outlet port having a cross sectional profile corresponding to that of the third profile section so that article material is extruded to define the third profile section, said second outlet port being exposed according to the sliding motion of said movable die to change the magnitude of an opening thereof so as to extrude the article material with varying geometry for forming the second profile section to vary the geometry of the article.

13. A die as set forth in claim 12, further comprising a first feed path for feeding article material for the first profile section, a second feed path for feeding article material for the second profile section, and a third feed path for feeding article material for the third profile section of the article, said second feed path, independent of said first and third feed paths, communicating with said second outlet port to provide flow of article material to the second outlet port regardless of the position of said movable die relative to the stationary die.

* * * * *